(No Model.)
J. M. COX.
HOSE COUPLING.
No. 520,952. Patented June 5, 1894.
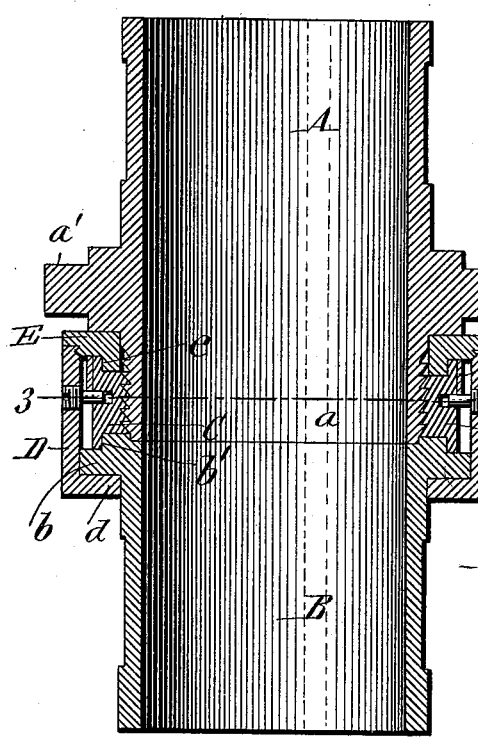
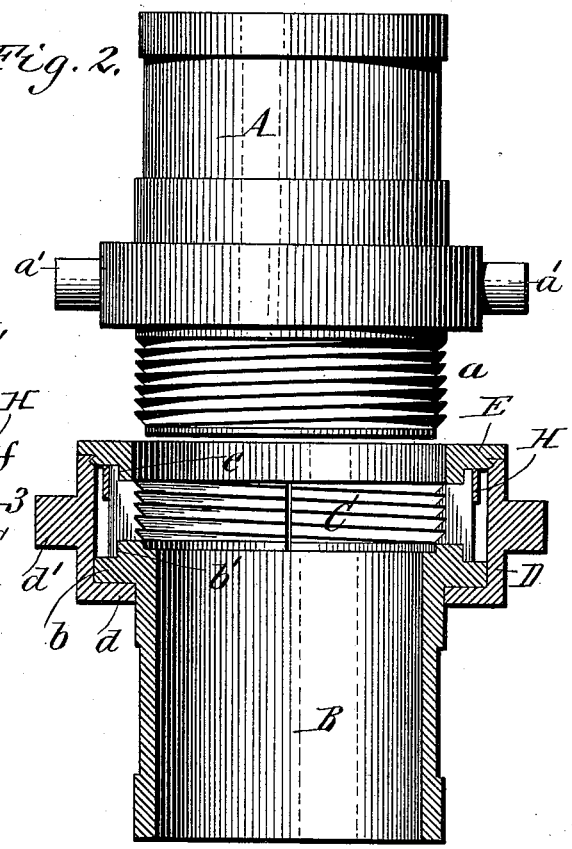
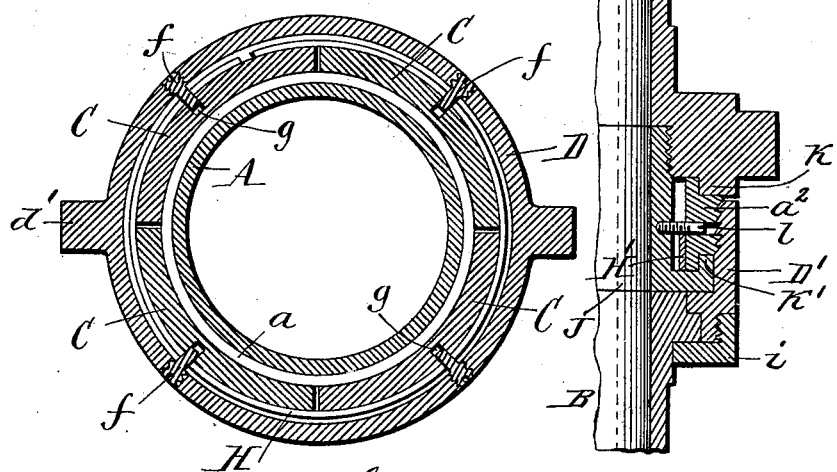
WITNESSES:
Chas. F. Burkhardt
Theo. L. Popp
INVENTOR.
James M. Cox
By Wilhelm Bonner
ATTORNEYS
THE NATIONAL LITHOGRAPHING COMPANY,
WASHINGTON, D. C.

UNITED STATES PATENT OFFICE.

JAMES M. COX, OF BUFFALO, NEW YORK, ASSIGNOR OF ONE-HALF TO BERNARD COHEN, OF SAME PLACE.

HOSE-COUPLING.

SPECIFICATION forming part of Letters Patent No. 520,952, dated June 5, 1894.

Application filed March 5, 1894. Serial No. 502,303. (No model.)

*To all whom it may concern:*

Be it known that I, JAMES M. COX, a citizen of the United States, residing at Buffalo, in the county of Erie and State of New York, have invented a new and useful Improvement in Hose-Couplings, of which the following is a specification.

This invention relates to an improvement in hose couplings in which the separable parts of the coupling are united by a screw-thread.

The object of my invention is to expedite the connection of the parts of the coupling, and it consists to that end in providing the coupling with a quick shifting screw-thread, which permits the parts to be united by a longitudinal movement of the same upon each other, so that a rotary movement of the parts is necessary only for tightening the coupling.

In the accompanying drawings: Figure 1 is a sectional elevation of my improved hose coupling, showing the parts united. Fig. 2 is a similar view, showing the parts separated. Fig. 3 is a cross section of the coupling in line 3—3, Fig. 1. Fig. 4 is a fragmentary sectional elevation of a modification of my invention.

Like letters of reference refer to like parts in the several figures.

A and B represent the two parts or sections of the coupling which are attached to the ends of the hose by any common means. The section A is provided with an externally screw-threaded portion a, the threads of which are abrupt on their rear sides and beveled or inclined on their front sides. The other section, B, of the coupling, is provided in its front end with a divided sectional or expansible screw nut C, the threads of which are abrupt on their rear sides and beveled on their front sides, to correspond to the external threads of the section A. This screw-nut is arranged within a rotary tightening collar D applied to the front end of the section B and confined thereon by an inwardly extending annular flange d formed at the inner end of the collar and overlapping a similar flange or shoulder b formed on the section B. The screw-nut bears at its inner end against the flange of the section B and is confined against longitudinal movement in the rotary collar by a ring E secured to the outer end of said collar. The sections of the divided nut are limited in their inward movement by shoulders b' and e formed at the outer ends of the coupling section B and the inner side of the ring E, respectively, and the adjacent portions of the screw-nut are recessed to permit its threads to project inwardly beyond the bore of said ring when the nut bears against said shoulders. The sections of the screw-nut are capable of moving radially toward and from the axis of the coupling and are guided in their movement by radial pins or screws f secured to the tightening collar D and projecting inwardly into corresponding openings or recesses g formed in the outer sides of the nut sections, as shown in Fig. 3.

H is a spring whereby the sections of the divided nut are yieldingly held against expanding or moving outwardly. This spring preferably consists of a split elastic band which loosely encircles the nut sections. The bore of the tightening collar is sufficiently larger than the diameter of the screw-nut, to permit the requisite expansion of the nut.

In uniting the two sections of the coupling, the externally threaded portion of the section A is passed into the expansible screw-nut of the other section and simply pressed inward until the end of the externally threaded portion abuts against the outer end of the opposing section. In thus connecting the coupling sections the beveled faces of the external screw-threads bearing against the corresponding faces of the threads of the screw-nut, wedge the nut-sections outward and slide over their threads in the manner of a pawl and ratchet, until the two coupling sections abut, when the sections of the screw-nut are pressed inward by the spring H and the threads of the nut caused to interlock with those of the other section, thereby preventing disconnection of the coupling sections by a longitudinal non-rotary movement of the sections upon each other. After the sections have been thus coupled, they are tightened by turning the collar D, whereby the threads of the two coupling sections are caused to screw upon each other, like the parts of an ordinary screw-joint. In tightening the parts, the sections of the screw-nut are compelled to turn with the tightening collar by the radial guide pins *f*. To permit the tightening collar to be conveniently turned, the same is provided with lugs or projections *d'* and the coupling section A is provided with similar projections *a'* for holding it against turning in tightening the coupling. As the parts of the coupling are connected by a simple longitudinal movement of one part upon the other, the coupling is effected very quickly, and as the parts are brought closely together by this movement, only a small rotary movement of the tightening collar is necessary to tighten the coupling. The parts are uncoupled by unscrewing the divided nut from the external thread of the other part by turning the tightening collar in the proper direction. If desired, the screw-nut or internally threaded portion of the coupling may be rigid and the externally threaded portion contractible or yielding, whereby the same result is obtained as in the first described construction. Such a construction is shown in Fig. 4. In this case, the internal screw-thread is formed on a rotary tightening ring D' which is confined upon the coupling section B by a flanged ring *i*. The externally threaded portion carried by the opposing part of the coupling is composed of radially yielding sections $a^2$ similar to those of the nut C, which are pressed outward by a band spring H' bearing against the inner sides of the sections, so as to resist the inward movement thereof. These sections surround a tubular extension J of the coupling part A and their outward movement is limited by flanges *k k'* formed at the outer ends of the coupling section A and the extension J. In tightening the coupling, the sections $a^2$ are caused to turn with the tubular extension J by radial pins *l* secured to the latter and entering openings in said sections.

In connecting the parts of this coupling, the externally threaded portion of one part is simply forced lengthwise into the rigid screw nut of the other part, as in the first described construction. The sections of the external thread yield inwardly in riding over the threads of the rigid nut, and interlock therewith as soon as the ends of the coupling sections abut.

I claim as my invention—

1. In a hose coupling, the combination with a coupling section having an externally screw-threaded portion and an opposing coupling section having a screw-nut or internally screw-threaded portion which receives such externally threaded portion, one of such screw-threaded portions being composed of yielding sections, whereby the parts of the coupling can be connected by a longitudinal movement of one part upon the other, substantially as set forth.

2. In a hose coupling, the combination with a coupling section having an external screw-thread, of an opposing coupling section having an expansible screw-nut or internal thread which receives the external thread of the other section, whereby the coupling sections can be united by a longitudinal movement of one section upon the other, substantially as set forth.

3. In a hose coupling, the combination with a coupling section having an externally screw-threaded portion having its threads provided with abrupt rear sides and beveled front sides, of an opposing coupling section having an expansible screw-nut provided with corresponding threads adapted to engage with the externally threaded portion of the other coupling section, substantially as set forth.

4. In a hose coupling, the combination with a coupling section having an external screw-thread, of an opposing coupling section having an expansible screw-nut which receives said external screw-thread, and a rotary collar whereby said screw nut is turned for tightening the coupling sections, substantially as set forth.

5. In a hose coupling, the combination with a coupling section having an external screw-thread, of an opposing coupling section having a divided screw nut which receives said external screw-thread, a spring for contracting the sections of the screw-nut, and a rotary tightening collar connected with the screw-nut, substantially as set forth.

6. In a hose coupling, the combination with a coupling section having an external screw thread, of an opposing coupling section having an expansible screw nut engaging with said external screw-thread having its sections provided with radial openings or recesses, and a rotary collar having pins or projections which engage in the openings or recesses of said nut-sections, substantially as set forth.

7. In a hose coupling, the combination with a coupling section having an external screw thread, of an opposing coupling section having a rotary tightening collar, a ring secured to the outer end of said collar, and an expansible screw-nut confined between said ring and the outer end of the adjacent coupling section and connected with said tightening collar, substantially as set forth.

Witness my hand this 23d day of February, 1894.

JAMES M. COX.

Witnesses:
THEO. L. POPP,
CARL F. GEYER.